United States Patent Office 3,296,895
Patented Jan. 10, 1967

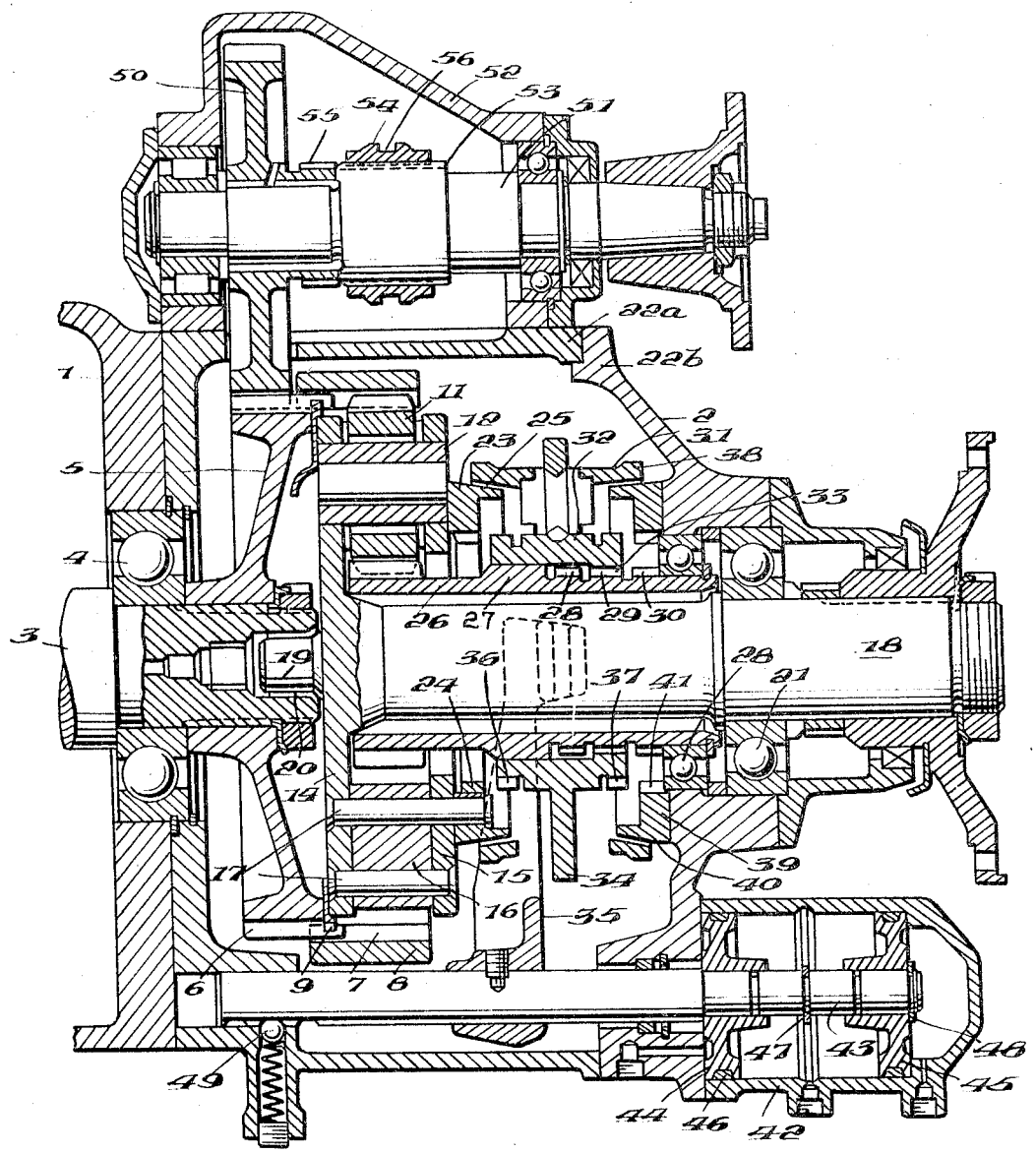
INVENTOR.
Folke Elis Karlsson

3,296,895
SUPPLEMENTARY GEAR SET INSERTABLE BE-
TWEEN A MAIN GEAR SET AND A TRANSMIS-
SION CONNECTED TO THE DRIVEN ROAD
WHEELS OF A MOTOR VEHICLE
Folke Elis Karlsson, Sodertalje, Sweden, assignor to
Aktiebolaget Scania-Vabis, Sodertalje, Sweden, a corporation of Sweden
Filed Dec. 17, 1962, Ser. No. 245,049
Claims priority, application Sweden, Dec. 19, 1961,
12,685/61
8 Claims. (Cl. 74—781)

This invention relates to transmission systems for motor vehicles of the type in which a multi-speed main gear set is combined with a supplementary gear set which is inserted between the main gear set and a transmission connected to the driven road wheels of the vehicle. If in a system of this kind the supplementary gear set has two gear ratios, the total number of different gear ratios will be twice the gear ratios of the main gear set, and the ratio coverage will be widened. The supplementary gear set according to the invention comprises a planetary gear having three elements, namely a sun gear, a ring gear and a planet carrier, one of said elements being connectible to the output shaft of the main gear set, another element being connectible to said transmission and the third element being connectible alternatively to one of the two other elements or to a stationary element. In its broadest aspect, the supplementary gear set according to the invention is characterized in that the planet carrier is connected to the transmission, that the third element is connectible to said carrier and that a synchronizing device is provided for adapting the speed of the third element to the speed of the planet carrier and for braking the third element to a standstill prior to its engagement with the carrier and the stationary element, respectively.

The supplementary gear set according to the invention is primarily intended to be used in trucks and the invention is based among other things on the experiences that at least trucks for long-distance transports during the major period of service are driven in the highest gear. With regard to economy of operation and wear the highest gear should establish direct drive, and in accordance the supplementary gear set which consequently gives therewith, the planet carrier is the output element of direct drive or speed reduction.

In order to establish direct drive, the third element of the planetary gear may be locked to one of the two other elements. While the vehicle is in motion, change from low gear where the third element is connected to the stationary element to direct drive is established by accelerating the third element to the speed of the planet carrier which is lower than the speed of the input element. Consequently, synchronizing is effected more quickly and with less wear of the friction surfaces of the synchronizing device.

A more detailed description of the invention and the constructional parts thereof follows hereinbelow with reference to the annexed drawing which shows an example of a suitable embodiment. The drawing illustrates a longitudinal sectional view of the supplementary gear set with its gear units and shifting members and the rear part of the main gear set as well as a longitudinal sectional view of a power take-off driven by the planetary gear.

Referring to the drawing, numeral 1 denotes the main gear set and numeral 2 denotes the supplementary gear set. The casing of the supplementary gear set consists of a gear box 22a and an end cover 22b bolted thereto. The output shaft 3 of the main gear set is mounted in a ball bearing 4 which takes radial and axial loads. The output shaft 3 is non-rotatably secured to a connecting member 5 in the form of a gear wheel having teeth 6 which at one end project into the gaps between the internal teeth 7 of a ring gear 8 forming part of a planetary gear. Axial displacement between the connecting member 5 and the ring gear 8 is prevented by a locking ring 9 which engages grooves in all of the teeth.

The ring gear 8 meshes with a plurality of planet gears 11 loosely mounted on studs 12 the ends of which are mounted in a planet carrier. The planet carrier consists of a circular disc 14 and a circular ring 15 with intermediate blocks 16, said parts being held together by rivets 17. The disk 14 is integral with an output shaft 18 which at one end has a journal 19 mounted in the rear end of the shaft 3 by means of a roller bearing 20. The opposite end of the output shaft 18 which is connected to the driven road wheels of the vehicle is mounted in the end cover 22b by means of a ball bearing 21 adapted to take radial and axial loads. The ring 15 is a non-rotatably connected with a clutch ring 23 having an internal gear ring 24 and a conical outside surface 25 for cooperation with a synchronizing clutch.

A sun gear 26 meshes with the planet gears 11 and is maintained in centered positions thereby. The sun gear has a tubular neck 27 which is mounted in the end cover 22b by means of a ball bearing 28 able to take radial and axial loads. The neck 27 has splines 28–30 and carries a gear shift sleeve 32 having corresponding splines 33 and forming part of a synchronizing clutch 31. The gear shift sleeve 32 is provided with a central actuating disk 34 for a gear shift bar 35 and is displaceable on the neck 27 but is in all positions non-rotatably connected therewith. At both ends the gear shift sleeve 32 has external gear rings 36 and 37, respectively. As will be explained later in further detail, gear ring 36 can be meshed with internal gear 24 to couple sun gear 26 with the planet carrier 14, and gear ring 37 can be meshed with a stationary internal gear 41 to brake sun gear 26 to standstill.

The synchronizing clutch may be devised in any suitable known manner. In the embodiment illustrated in the drawing there is provided a synchronizing sleeve 38 which is axially displaceable but not rotatable relative to the gear shift sleeve 32 and in a manner known per se is moved axially by the gear shift sleeve 32 during the synchronizing operation of a gear unit, but after completed synchronizing is released from the gear shift sleeve which is engaged with the toothed clutch appertaining to the gear unit. For braking the sun gear 26 and locking it to the end cover 22b this cover is secured to a brake ring 39 having a conical outer surface 40 and an internal gear ring 41 which is then meshed with gear 37 on sleeve 32.

In the embodiment illustrated in the drawing a servo device for shifting the planetary gear comprises a pressure medium cylinder 42 which is bolted to the end cover 22b and has two individually displaceable pistons 44 and 45 which are mounted on a common piston rod 43 and divide the cylinder into three chambers. Each of these chambers communicates independently of the two other ones through a conduit with a valve device, not shown, adapted to permit supply of a medium under pressure to each individual chamber and to discharge the medium from the chambers. The piston rod 43 has a shoulder 46 and two stop rings 47 and 48 for limiting the lost motion of the pistons on the piston rod.

With the parts in the position illustrated the pistons 44, 45 have been moved to their respective end walls of the cylinder 42 by means of pressure medium supplied into the chamber between the pistons. At the same time, the piston 44 has come into contact with the shoulder 46, and the piston 45 has come into contact with the stop ring 48 on the piston rod. The condition corresponds to the neutral position of the planetary gear. The gear shift bar 35 is rigidly secured to the piston rod 43 and maintains the gear shift sleeve 32 in neutral position between the gear rings 24 and 41 of the planetary gear. In order to maintain the neutral position even without the action of the medium under pressure, the piston rod is adapted to be locked in a conventional manner by means of detent ball 49. The same holds true of the two gear ratio positions.

To change the planetary gear from neutral position to ratio drive, medium under pressure is admitted to the chamber between the piston 44 and the adjacent end wall of the cylinder, and the pressure medium in the intermediate chamber is discharged. As a consequence, the piston 44 is moved to the stop ring 47 whereupon the piston rod 43 together with the gear shift bar 35 and the gear shift sleeve 32 are moved to the right as viewed in the drawing until the stop ring 47 and the piston 44 are stopped by the piston 45 which assumes its righthand end position near the corresponding end wall of the cylinder. This causes gear ring 37 on the gear shift sleeve 32 to mesh with stationary gear ring 41 integral with the casing cover plate 22b and thus prevents the sun gear 26 from rotating since gear shift sleeve 32 is mounted on sun gear 26 in a non-rotatable manner relative to it. In a corresponding manner, direct drive through the planetary gear can be established by admitting pressure medium into the chamber to the right of the piston 45. This causes gear ring 36 on the gear shift sleeve 32 to mesh with teeth 24 on clutch ring 23 which is secured to planet gear carrier 14. Thus sun gear 26 is coupled directly to planet carrier 14. However, with the vehicle in motion shifting from one to the other gear position is performed directly in passing the neutral position. In this case, pressure under medium is alternatingly supplied to the end chambers only of the cylinder.

The power take-off shown by a sectional view in the drawing comprises a gear wheel 50 which permanently meshes with the above named gear wheel 5 on the output shaft 3 of the main gear set. The gear wheel 50 is freely mounted on a shaft 51 the two ends of which are mounted in a bearing case 52 provided on the gear box 22a laterally of the planetary gear. The bearing case is bolted to a flange of the gear box and is consequently detachable. The shaft 51 carries a clutch collar 54 displaceable on splines 53, and the gear wheel 50 is formed with corresponding splines 55.

In the position illustrated the shaft 51 is disengaged. By means of a clutch fork or similar member which engages a groove 56 in the clutch collar 54 the shaft 51 can be coupled, if required, to the gear wheel 50 for driving an equipment provided on the vehicle. If the power take-off is used when the vehicle is at rest the planetary gear has to be disengaged from the transmission to one or more driven vehicle axles. Due to the connection of the power take-off to the output shaft of the main gear set and due to the disengaging means it is possible to use the power take-off with all gear ratios of the main gear set, that is, within a wide ratio coverage and with full engine power when the vehicle is at rest. However, there is nothing to prevent the power take-off from being used for certain purposes while the vehicle is in motion with the planetary gear in direct drive or ratio drive. Since the power take-off is connected to the output shaft of the main gear set irrespective of the location of the supplementary gear set in the vehicle, the load on the power take-off cannot unfavourably influence the shifting operation in the main gear set. Consequently, the power take-off according to the invention is favourably distinguished even in this respect from the types of power take-off which for instance via engageable gear wheels, are driven by the counter-shaft of the main gear set and render the shifting operation more difficult because of the additional masses connected with the counter-shaft.

With the described operating cylinder having three fixed selectible gear ratio positions it is possible, as mentioned above, to fix the gear shift sleeve of the synchronizing device in a neutral position for disengaging the planetary gear from the transmission for the drive of the vehicle, which is necessary if the power take-off is used in stationary vehicles. If the vehicle is equipped with a supplementary gear set without power take-off it is of course possible to use an operating cylinder having a single piston for both gear ratio positions, of the planetary gear.

What I claim is:

1. A supplementary gear set insertable between a main gear set and a transmission connected to the drive road wheels of a motor vehicle, said complementary gear set comprising a planetary gear having three elements, namely, a sun gear, a ring gear and a planet gear carrier, an input shaft, a main output shaft, and a power take-off shaft, a first gear wheel secured to said input shaft and a second gear wheel mounted on said power take-off shaft and meshing with said first gear wheel, adjustable coupling means adapted in a first position to connect said sun gear to said planet gear carrier and in a second position to connect said sun gear to a stationary member and in a third position to leave said sun gear idling, said planet gear carrier being connected to said main output shaft and its planet gears being in mesh with said sun gear and said ring gear, the rim of said first gear wheel being broader than that of said second gear wheel and the rim of said ring gear being broader than that of said planet gears, a portion of said first gear wheel being inserted in said ring gear and having its teeth projecting into and fitting in the gaps between the teeth of said ring gear, the interengaging parts of the teeth of these two elements being provided with recessed portions of receiving a locking ring for preventing relative axial displacement of the elements.

2. A supplementary gear set as claimed in claim 1 wherein recessed portions of the teeth of one of said elements are located at their tops and the recessed portions of the teeth of the other element are located at their bases, said last-mentioned recessed portions constituting a groove accessible from the side of the rim radially remote from the teeth.

3. A supplementary gear set as claimed in claim 1 and comprising a releasable coupling between said second gear wheel and said power take-off shaft.

4. A supplementary gear set as claimed in claim 1 and comprising a servo motor for operating said adjustable coupling means, said servo motor consisting of a cylinder in which there are provided two pistons individually displaceable on a common piston rod and having different limited ranges of movement on the piston rod, said pistons dividing the cylinder into three chambers having means for the supply and discharge of medium under pressure, whereby to provide for three different adjusting positions of the piston rod.

5. A supplementary gear set as defined in claim 1 wherein said sun gear includes a tubular shaft part surrounding said output shaft and said adjustable coupling means includes a gear shift sleeve surrounding said tubular shaft part of said sun gear, said gear shift sleeve being axially displaceable on said tubular shaft part of said sun gear but non-rotative relative thereto, said gear shift sleeve being provided with two axially spaced gear rings thereon, movement of said gear shift sleeve in one direction from a neutral position effecting engagement between one of said gear rings thereon and a stationary gear ring to thereby brake said sun gear to standstill, and movement of said gear shift sleeve in the opposite direction from said neutral position effecting engagement between the other of said gear rings thereon and a gear ring on said planet carrier thereby to directly connect said sun gear to said planet carrier.

6. A supplementary gear set as defined in claim 5 and which further includes a synchronizing clutching means actuated by movement of said gear shift sleeve in said opposite direction for synchronizing rotation of said gear shift sleeve and hence also said sun gear with rotation of said planet carrier prior to meshing of said other gear ring on said gear shift sleeve with said gear ring on said planet carrier.

7. A supplementary gear set as defined in claim 6 wherein said synchronizing clutching means comprises a rotatable synchronizing clutch sleeve surrounding and carried by said gear shift sleeve, said synchronizing clutch sleeve being non-rotatable relative to said gear shift sleeve but movable axially therewith from a neutral position corresponding to a neutral position of said gear shift sleeve to engage a conical surface on said planet carrier thereby clutching said gear shift sleeve and hence also said sun gear to said planet carrier.

8. A supplementary gear set as defined in claim 7 and which further includes releasable means for maintaining said gear shift sleeve in its neutral position.

References Cited by the Examiner
UNITED STATES PATENTS

| | | | |
|---|---|---|---|
| 2,001,141 | 5/1935 | Kittilsen | 74—339 |
| 2,896,479 | 7/1959 | Kelbel | 74—781 |

FOREIGN PATENTS 645,528  11/1950  Great Britain.

DAVID J. WILLIAMOWSKY, *Primary Examiner.*

DON A WAITE, *Examiner.*

J. R. BENEFIEL, *Assistant Examiner.*